Sept. 18, 1956 C. F. STUART 2,763,110
PACKING
Filed July 17, 1953 2 Sheets-Sheet 1
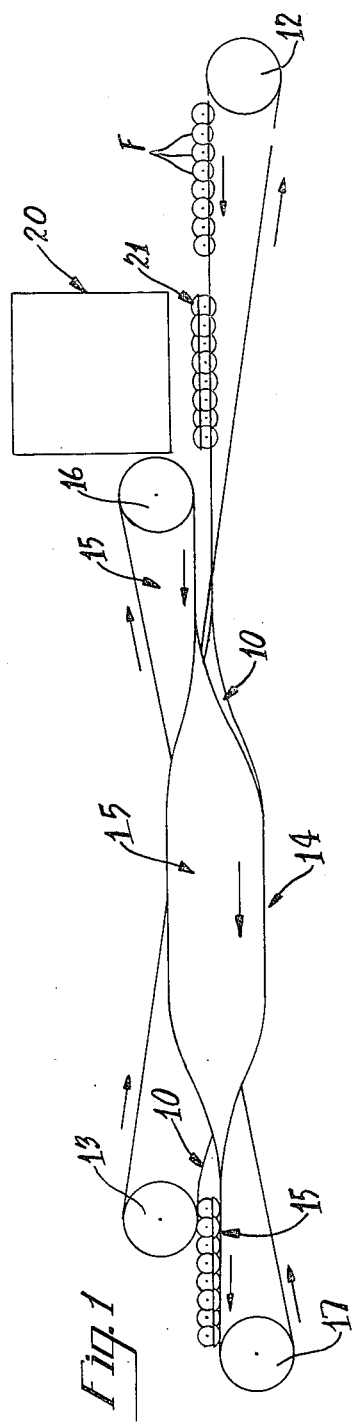
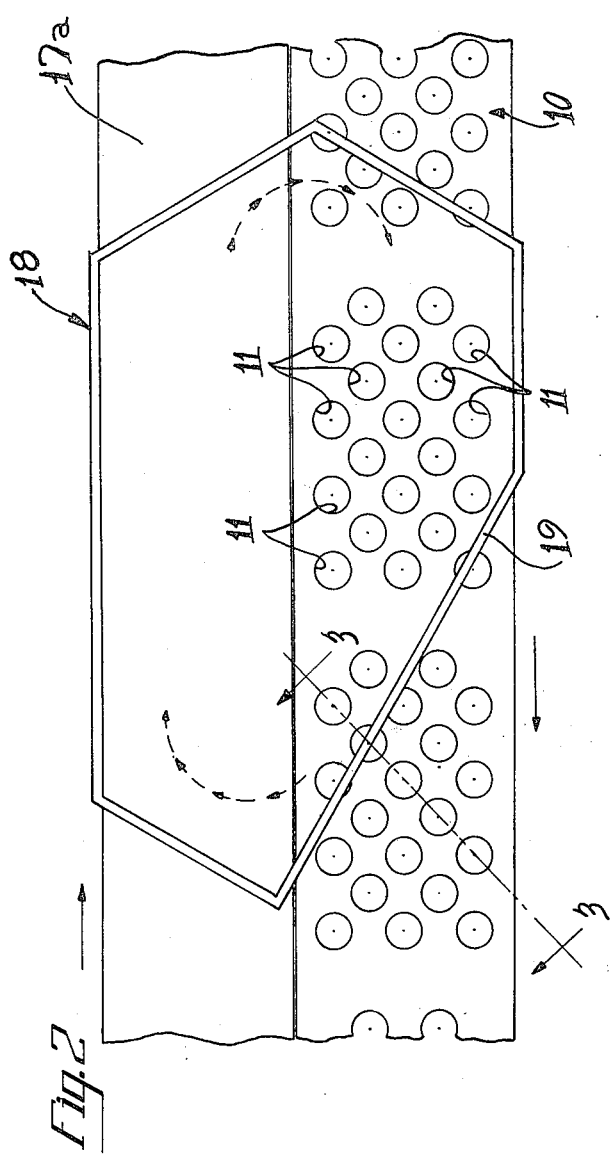
INVENTOR.
CLIFTON F. STUART
BY
ATTORNEY

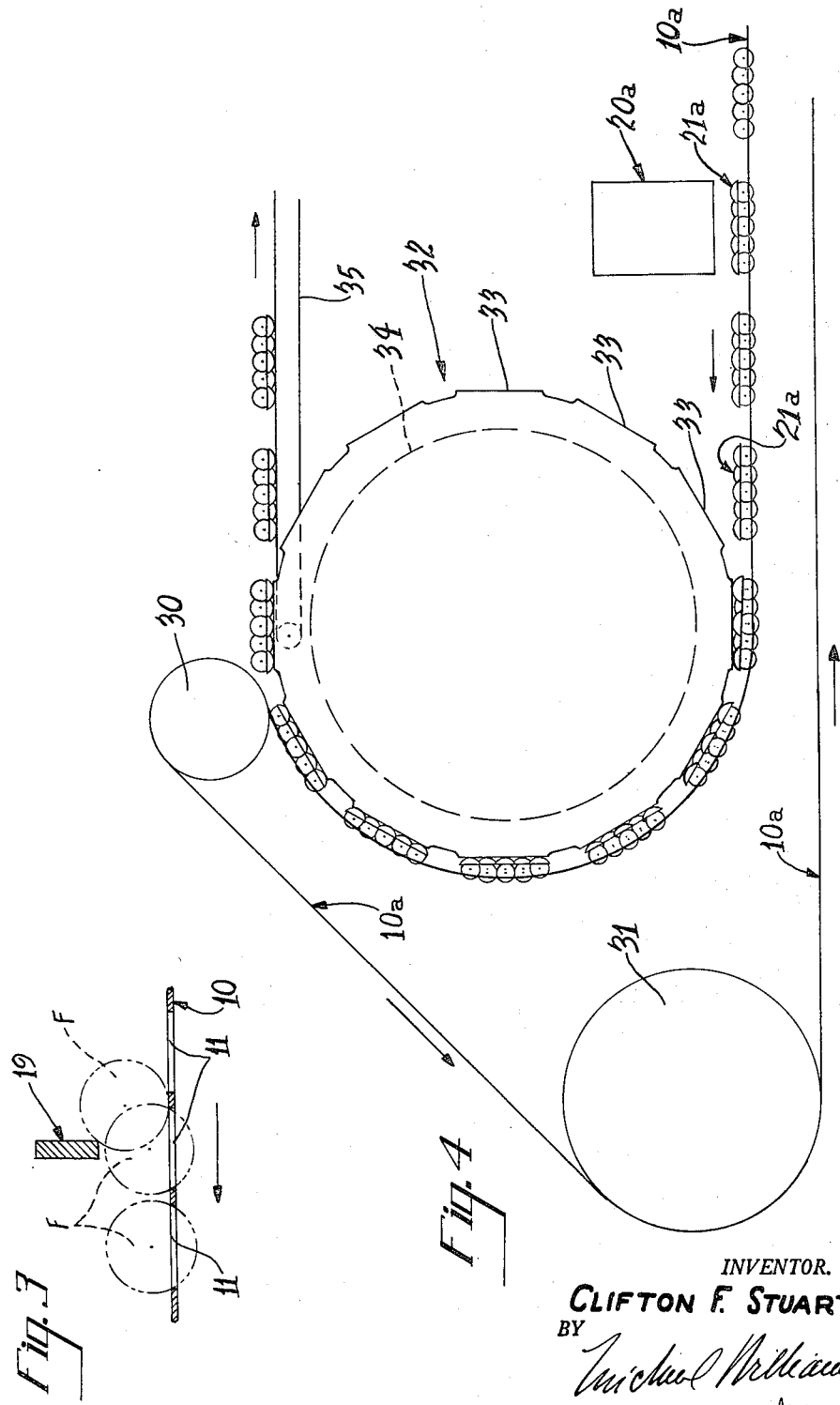

United States Patent Office

2,763,110
Patented Sept. 18, 1956

2,763,110

PACKING

Clifton F. Stuart, Warren, Ohio, assignor to Clifton-Grant Development Corporation, Warren, Ohio, a corporation of Ohio Application July 17, 1953, Serial No. 368,623

2 Claims. (Cl. 53—243)

My invention relates to packing, more particularly to methods of and apparatus for packing fruit and the like, and the principal object of my invention is to provide new and improved apparatus of the character described.

Handling and packing fruit has long been expensive process since it has been done largely by hand. Machines have been employed to wash fruit and sort it according to size, and conveyor belts and the like have been employed to transport the fruit between various processing stages; however, no one has heretofore devised a machine that will satisfactorily pack fruit.

It has been found that fruit may be packed in a box more tightly and with less danger of bruising if it is packed in layers separated by trays of papier-mache or the like. Accordingly, it has been common practice to first pack the fruit in shallow papier-mache trays having pockets for receiving the fruit in a predetermined pattern and then stacking the trays in a box for shipment.

One of the objects of my invention is to provide apparatus that will fill the aforementioned trays, or trays of any other suitable kind or type, with fruit to thus eliminate an expensive hand operation. This and other advantages will become apparent from a study of the following description and of the drawings appended hereto. It will be apparent that my invention may be used to pack or position articles other than fruit and the term fruit is hereinafter used only as a means of designating one of the many articles which may be packed or positioned through use of my invention.

In the drawings accompanying this specification and forming a part of this application, there are shown, for purposes of illustration, two embodiments which my invention may assume, and in these drawings:

Figure 1 is a diagrammatic view illustrating a preferred embodiment of my invention, Figure 2 is a fragmentary, enlarged view of a portion of the apparatus shown in Figure 1, Figure 3 is a fragmentary, further enlarged view generally corresponding to the line 3—3 of Figure 2, and Figure 4 is a diagrammatic view of another embodiment of my invention.

As shown in Figure 1, the apparatus chosen to illustrate my invention comprises a conveyor belt 10 formed of any suitable material and, in the present embodiment, having a series of apertures 11 (see Fig. 2) for receiving and holding fruit or the like in a predetermined pattern. As will later be made clear, each aperture 11 is large enough to provide a pocket for receiving a piece of fruit but small enough to prevent the fruit from falling through.

The conveyor belt 10 is guided at one end by a drum, or roller, 12 and at the other end by a roller 13, a portion of the belt intermediate the rollers being twisted at 14 through approximately 180° for a purpose later to be disclosed.

A conveyor belt 15, similar to belt 10 but without the apertures 11, has a portion disposed adjacent conveyor belt 10. This belt is guided at one end by a roller 16 and at the other end by a roller 17. Belt 15 is twisted at 14 in a manner similar to belt 10, and as illustrated, the belt portions are closely spaced and are parallel with each other to provide a spiral pass. Although not shown, guides may be provided to insure proper spacing and positioning of the respective belts.

As before mentioned, fruit F is adapted to be disposed in the apertures 11 of the belt 10 by any suitable means. For example, a conventional two-way belt arrangement may be utilized and as shown in Figure 2, may comprise a conveyor belt 17a disposed adjacent to and in edge-to-edge relation with the conveyor belt 10. A walled enclosure 18 is provided above and closely adjacent the belts 10, 17a, the enclosure being adapted to receive and contain the fruit.

The belts 10, 17a are adapted to be driven beneath the enclosure 18 in opposite directions (as shown by the arrows) by any suitable means, and fruit trapped within the enclosure 18 will circulate from one belt to the other (as shown by the dotted-line arrows) because of the angularity of the walls of the enclosure with respect to the direction of travel of the belts.

As shown in Figures 2 and 3, a wall 19 of the enclosure 18 is spaced above the belt 10 a distance sufficient to permit the belt to carry pieces of fruit F that are seated within an aperture 11 beneath the lower edge of the wall. However, the wall 19 will effectively prevent a piece of fruit from escaping from the enclosure 18 if it is resting upon the upper surface of the belt.

It is to be understood that the enclosure 18 is adapted to be filled with fruit in any suitable manner, for example, the enclosure could be fed from any suitable, commercially available fruit cleaning or sorting machine. It is further to be understood that the apparatus herein shown for depositing fruit in the apertures 11 is illustrative only and that a hopper or any other suitable device may be employed to perform this function.

As illustrated in Figure 1, a tray dispensing device 20 is disposed above the belt 10 as shown and is adapted to release an inverted tray 21 upon the fruit carried by the belt 10. As will be understood, each tray 21 is formed to provide a plurality of pockets corresponding in number and arrangement to any one of a series of apertures 11 in the belt 10.

Operation of the embodiment of the invention illustrated in Figures 1, 2 and 3 is as follows: With the conveyor belts 10, 15 and 17a traveling in the direction indicated by the arrows and with the enclosure 18 filled with fruit, the series of apertures 11 in the belt 10 will be filled with fruit in the manner heretofore described. As the fruit carried by the belt 10 passes beneath the tray dispensing mechanism 20, any suitable means may be employed to release an inverted tray 21 so that it will gravitate to a position overlying the fruit. As will be clear, each piece of fruit will be seated in a respective pocket in the tray 21.

As the conveyor belt 10 continues its movement, the fruit together with the tray which overlies it will be carried through the spiral pass formed by the belts 10, 15 that are twisted at 14 in the manner heretofore described. After passing through the spiral pass, the tray and the fruit will be righted and, as shown at the left in Figure 1, the fruit will be supported by the tray 21 which is now resting upon the conveyor belt 15. The tray 21 together with the fruit supported thereby may now be removed from the belt 15 by any suitable apparatus, or by hand, and placed in a box for shipment.

Obviously, each succeeding series of apertures in the belt 10 will be filled with fruit, a tray deposited upon the fruit, and the fruit and the tray righted as above described. My invention will therefore fill trays with fruit in rapid succession and at a great savings in cost and the filled trays may be stacked in boxes or other shipping containers quickly and easily.

Referring now to Figure 4 wherein another embodiment of my invention is illustrated, it will be seen that a conveyor belt 10a is guided over rollers 30 and 31 and about a drum 32. The belt 10a is similar to belt 10 and is provided with a series of apertures each adapted to receive a piece of fruit. However, in this embodiment it is preferred to provide a wider belt and to arrange each series of apertures transversely of the belt instead of longitudinally of the belt as shown in Figures 1 and 2.

Any suitable means may be employed to deposit fruit in the apertures in the belt 10a, for example, the apparatus shown in Figures 2 and 3 may be advantageously employed. A tray dispensing device 20a may be employed to deposit an inverted tray 21a upon the fruit, the device 20a being similar to device 20 and operating in a similar manner.

Drum 32 and conveyor belt 10a are adapted to be driven together by any suitable means, it being understood that the drum is driven in manner so that its periphery moves at the same speed as the belt. The periphery of the drum 32 is formed to provide a plurality of surfaces 33 that are adapted to abut a respective tray 21a overlying the fruit carried by the belt 10a. The drum 32 is recessed at 34 to provide clearance for a conveyor 35 whose purpose will later become clear.

Operation of the embodiment of my invention shown in Figure 4 is as follows: With belt 10a and drum 32 moving in the direction indicated by the arrows, fruit will be deposited upon the belt and carried beneath the tray dispensing device 20a in the manner previously described. As will be clear, when the fruit passes beneath the device 20a, an inverted tray will be deposited upon the fruit and continued movement of the belt 10a will move each tray 21a into engagement with a respective surface 33 of the drum 32.

As movement of the belt 10a and the drum 32 continues, each tray 21a will be carried around the drum 32, the fruit in each tray being held against displacement therefrom by the belt 10a. As the tray reaches the top of drum 32 and as the belt 10a passes around roller 30, the belt will become disengaged from the fruit carried by the tray. Since the tray is now positioned in generally upright relation the fruit will remain therein without support.

It will be clear that continued rotation of the drum 32 will deposit each tray upon the conveyor 35 which will carry the trays to any convenient location where the loaded trays will be removed and packed in boxes or other shipping containers.

In view of the foregoing it will be apparent to those skilled in the art that I have accomplished at least the principal object of my invention and it will also be apparent to those skilled in the art that the embodiments herein described may be variously changed and modified, without departing from the spirit of the invention, and that the invention is capable of uses and has advantages not herein specifically described, hence it will be appreciated that the herein disclosed embodiments are illustrative only, and that my invention is not limited thereto.

I claim:

1. Apparatus for packing fruit and the like in a container having a plurality of fruit receiving recesses arranged in a predetermined pattern, comprising a conveyor having a plurality of pockets each adapted to receive a piece of fruit, said pockets being arranged in a predetermined pattern corresponding to the pattern of the recesses in said container and said conveyor being adapted to support said container in inverted relation over said fruit, and means adapted to reverse the relative positions of said conveyor and said fruit to thereby right said container with the fruit positioned in said recesses.

2. Apparatus for packing fruit and the like in a container, comprising a first conveyor belt having a plurality of pockets in which fruit is receivable and upon which an inverted container is adapted to be positioned, a second conveyor belt in edge to edge relation with said first belt, means for moving said conveyor belts in opposite directions, means providing an open bottom enclosure positioned above said conveyors and extending thereacross for containing a quantity of fruit and within which said fruit circulates from one conveyor to the other during movement of said conveyors, the enclosure wall adjacent said first conveyor belt being spaced sufficiently above such belt to permit fruit to escape therebeneath when such fruit is positioned in said pockets, and means adapted to reverse the relative positions of said first conveyor and said fruit to thereby right the container with the fruit positioned therein.

References Cited in the file of this patent

UNITED STATES PATENTS

| Number | Name | Date |
|---|---|---|
| 1,243,406 | Hawthorne | Oct. 16, 1917 |
| 1,384,461 | Halset | July 12, 1921 |
| 1,945,758 | Turner | Feb. 6, 1934 |
| 2,438,089 | Carson | Mar. 16, 1948 |
| 2,493,837 | Smith | Jan. 10, 1950 |
| 2,526,309 | Welch | Oct. 17, 1950 |
| 2,605,883 | Thames | Aug. 5, 1952 |